(12) United States Patent
Kamp et al.

(10) Patent No.: US 9,451,744 B1
(45) Date of Patent: Sep. 27, 2016

(54) WIND DEFENDER, DUST CONTROL PROCESS

(71) Applicant: Wind Defender, LLC, Middle River, MD (US)

(72) Inventors: Ryan Kamp, Baltimore, MD (US); Ryan Clark, Baltimore, MD (US)

(73) Assignee: Wind Defender, LLC, Middle River, MD (US)

( * ) Notice: Subject to any disclaimer, the term of this patent is extended or adjusted under 35 U.S.C. 154(b) by 0 days.

(21) Appl. No.: 14/839,265

(22) Filed: Aug. 28, 2015

(51) Int. Cl.
*A01G 13/02* (2006.01)
*E02D 3/00* (2006.01)
*A01G 13/00* (2006.01)
*B09B 1/00* (2006.01)

(52) U.S. Cl.
CPC ........... *A01G 13/0268* (2013.01); *B09B 1/004* (2013.01); *E02D 3/005* (2013.01)

(58) Field of Classification Search
CPC .............. B09B 1/004; A01G 13/0268; A01G 13/0256; A01G 13/0287; E02D 17/202; E02D 31/004; E02D 17/20; E02D 17/00; E02B 3/122; Y02W 30/32
See application file for complete search history.

(56) References Cited

U.S. PATENT DOCUMENTS

| | | | | |
|---|---|---|---|---|
| 4,610,568 A | * | 9/1986 | Koerner | E02D 17/202 405/15 |
| 5,651,641 A | * | 7/1997 | Stephens | D04H 11/00 405/302.6 |
| 5,795,835 A | * | 8/1998 | Bruner | D04B 21/12 442/310 |
| 8,871,659 B2 | | 10/2014 | Deschamps | |

OTHER PUBLICATIONS

State of California Department of Transportation, Caltrans Storm Water Quality Handbooks: Construction Site Best Managment Practice (BMPs) Manual, Mar. 2003, Section 3, pp. 1-11.*
Dust Tamer Wind Fence at the website http://www.nodust.com/Other/what-is-dusttamer.html. Website is owned by Dust Solutions Incorporated of South Carolina, USA. Attached website printed Aug. 17, 2015.
Fence Screens at the website www.fencescreen.com. Website is owned by FenceScreen, Inc. of California, USA. Website was printed Aug. 17, 2015.

* cited by examiner

*Primary Examiner* — John Kreck
*Assistant Examiner* — Carib Oquendo
(74) *Attorney, Agent, or Firm* — Larry J. Guffey, Esq.; Pamela K. Riewerts, Esq.; Oliver & Grimsley, LLC

(57) ABSTRACT

An improved process for minimizing the rising of airborne dust from a substantially non-vegetated, wind-swept, ground surface (i.e., the ground surface to-be-treated, GSTBT) includes the steps of: (a) spreading directly on this GSTBT a continuous layer of a thin, porous, polymeric fabric, (b) adhering portions of the boundary edge of the fabric to the GSTBT at a plurality of locations that are proximate the GSTBT's perimeter edge, (c) utilizing this thin, porous, polymeric fabric in the form of a roll having a uniform roll width, (d) wherein the spreading step further includes unrolling a roll of the fabric so as to lay down and cover the GSTBT with parallel and adjoining strips of the fabric that have over-lapped edges, and (e) adhering together the over-lapped edges of the adjoining strips so as to create a continuous fabric that covers the GSTBT.

12 Claims, 3 Drawing Sheets

WIND DEFENDER, DUST CONTROL PROCESS

BACKGROUND OF THE INVENTION

1. Field of the Invention

The present invention generally relates to earth engineering, and specifically, to a process for minimizing the rising of airborne dust from a substantially non-vegetated, wind-swept, ground surface.

2. Description of the Related Art

Dust suppression and control (i.e., the minimization of airborne dust temporarily rising from and then resettling onto a site) on exposed earth surfaces is a continuing health and operational problem when people or machinery must be working on such sites during periods of airborne dust swirling. Surfaces such as construction and various manufacturing or industrial sites and waste disposal sites generate substantial dust in windy weather conditions or when stirred by vehicular traffic or the operation of various types of mechanical machinery on the site; see FIG. 3A.

There are various prior art ways of dealing with such dust problems so as to minimize the annoyance and hazards that airborne dust presents to the people and machinery working on such sites. One way is to spray water. However, this method is labor intensive as the surface has to be maintained in a damp condition and damp surfaces dry quickly in many areas.

In some instances, petroleum products, such as diesel fuel, have been used to spread on earth surfaces to reduce dust and erosion. However, such products have been found to cause contamination of water supplies so these products for such an application are now prohibited in most areas. Chemicals such as magnesium chloride, re-claimed asphaltic materials, resins, lignins, lignin sulfonates, lecithin and its derivatives, and various other materials, such as vegetable oils, have and are being used in various circumstances, but they also have the associated problems of contamination, and only short term effectiveness because they are relatively quickly washed away by rain water, etc.

In summary, there is a need for processes for minimizing the rising of airborne dust from wind-swept, ground surfaces.

SUMMARY OF THE INVENTION

Recognizing the need for improved processes for minimizing the rising of airborne dust from a wind-swept, ground surfaces, the present invention is generally directed to providing such improved processes and methods.

In a preferred embodiment, the present invention is such an improved process that includes the steps of: (a) spreading directly on the entirety of such a substantially non-vegetated, ground surface (i.e., the ground surface to-be-treated, GSTBT, which has a perimeter edge and a surface area that is characterized in terms of a representative width, W, times a representative length, L) a continuous layer of a thin, porous, polymeric fabric, and (b) adhering portions of the boundary edge of the fabric to the GSTBT at a plurality of locations that are proximate the GSTBT's perimeter edge.

The improved process may further include the steps of: (c) utilizing this thin, porous, polymeric fabric in the form of a roll that has a uniform roll width, $w_r$, (d) when $W > w_r$, the spreading step further includes unrolling a roll of the fabric so as to lay down and cover the GSTBT with parallel and adjoining strips of the fabric that cover the GSTBT's entire length and wherein the boundary edges of each of these unrolled strips are over-lapped a prescribed amount, and (e) adhering together the over-lapped, boundary edges of the parallel and adjoining strips so as to create a continuous fabric which has enough combined width in order to cover the entire width, W, of the GSTBT.

For the best performance in this application for minimizing the rising of airborne dust from a wind-swept, ground surface, the fabric used in this process has the following physical properties: (f) made from an ultra violet (UV) stabilized, high density polyethylene (HDPE) material, (g) a porosity in the range of 20% to 80%, (h) a thickness in the range of 0.5 to 2 millimeters, (i) a weight per unit surface area in the range of 100 to 250 $g/m^2$, and (j) wherein its method of construction is chosen from the group including knitting or weaving techniques that utilizes the material in the form of an effective yarn that has an average, effective diameter in the range of 0.1 to 0.4 millimeters.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
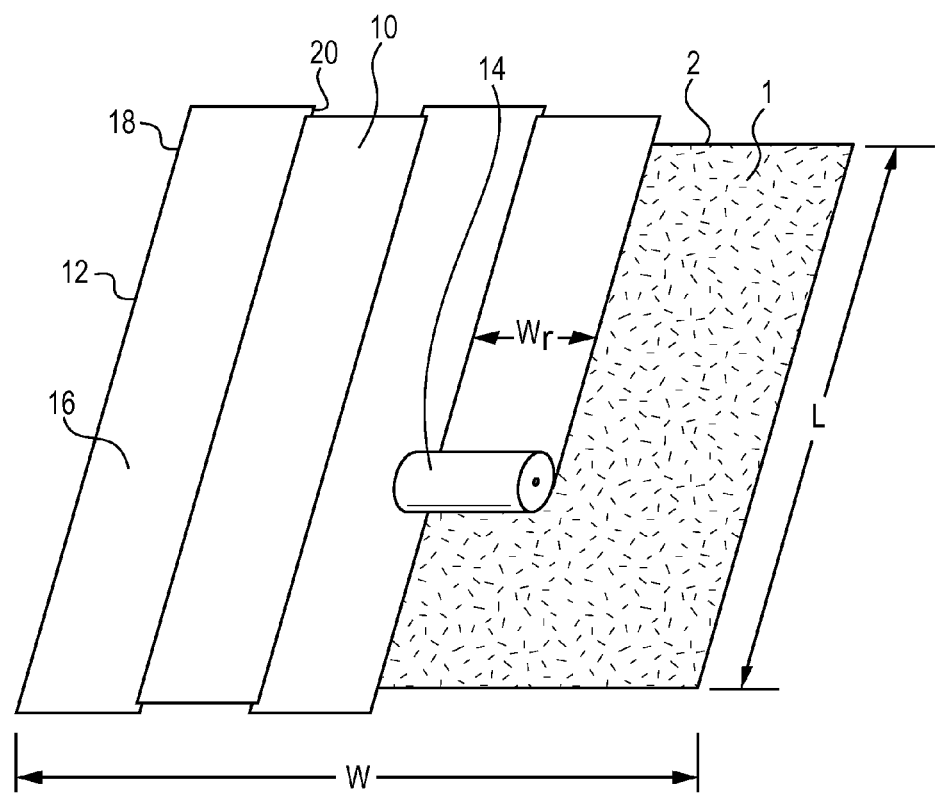
FIG. 1 is an illustration at an instant in time when the process of the present invention is being used to treat (i.e., minimize the amount of airborne dust rising from) a substantially non-vegetated, wind-swept, to-be-treated, ground surface (i.e., GSTBT) that has a perimeter edge and a surface area that is characterized in terms of a representative width, W, times a representative length, L.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. For lexicon purposes, the terminology "dust" and "particulate matter" are used interchangeably. The present invention generally relates to an improved process for minimizing the rising of airborne dust from a wind-swept, ground surface—wherein in our definition of ground surfaces we include stockpiles of materials other than soil (e.g., gypsum, coal ash, coal) where dust migration could be or is a problem. FIG. 1 is an illustration, at an instant in time, when the process of the present invention is being used to treat a substantially non-vegetated, to-be-treated, ground surface (i.e., GSTBT) 1 that has a perimeter edge 2 and a surface area that is characterized in terms of a representative width, W, times a representative length, L. Examples of ground surfaces from which it would be beneficial to minimize airborne dust include: large industrial worksites such as landfills, some of the storage and work areas around coal power plants, and the ground near mirrored solar panels where dust and particulate matter rising from this ground and settling on the mirrors can greatly reduce such solar panels' ability of collecting solar energy.

This process is seen to include the spreading directly on the entire GSTBT of a layer of a thin, porous, polymeric fabric 10. To prevent the movement of this fabric, portions of its boundary edge 12 are adhered at various locations around or proximate to the perimeter edge 2 of the GSTBT. This can be done by various means, including either burying the fabric's boundary edge in the ground or by using stakes or other means to adhere the boundary edge to the ground.

Since the GSTBT sites where this fabric will be used often entail large, multi-acre, surface areas (of representative magnitude W×L), an efficient means had to be found for how to spread and apply the fabric of the present invention so as to entirely cover such GSTBT sites. The fabric comes off a manufacturing line in the form of an effectively endless strip, layer or mat of fabric that has a specified width, $w_r$. At the end of this manufacturing line, the fabric is wound or rolled onto a central tube until a specified length, $l_r$, of it is collected in the form of a roll 14 of fabric. Multiple rolls of such fabric are then sent to the typical GSTBT site. The task of covering the entire GSTBT site begins by placing one roll of fabric in a corner of the GSTBT and adjacent a typically, straight-edged portion of the GSTBT's perimeter edge 2. The roll of fabric is then unrolled in the form of a strip, panel or layer 16 of fabric whose outer edge 18 is aligned above and along the GSTBT's perimeter edge 2 until it comes to the end of the GSTBT and the just unrolled strip of fabric is cut between its edges so as to release it from the roll.

This roll is then moved so that its outer edge overlaps and aligns with the inner edge 20 of the just unrolled strip of fabric. Another adjoining strip of fabric is then unrolled next to the initially unrolled strip. This process of unrolling adjoining strips of fabric with overlapping edges is continued until the entire GSTBT is covered. To ensure that the unrolled strips of fabric perform as a continuous membrane in covering the GSTBT, the overlapped edges of the various fabric strips are bound together. There are many ways to perform this bounding or attachment task onsite and all of these are considered to come within the scope of the present invention; these include stapling, sewing or heating bonding together the overlapped edges.

There are many geotextile fabrics that are suitable for use in the process of the present invention. For these fabrics, the present invention is effectively a new use of an existing product.

Figure 2A:
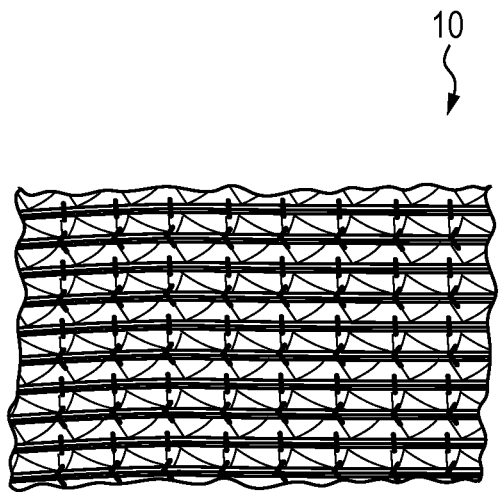
FIGS. 2A and 2B show types of thin, porous, polymeric, geotextile fabric that are suitable for use in the process of the present invention.
Figure 2B:
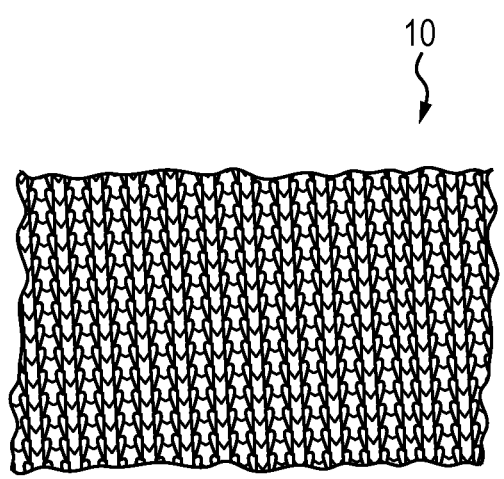

From experimentation, it has been found that thin, porous, polymeric fabrics having the following physical properties are the best suited for their durability and performance in minimizing the rising of airborne dust from a wind-swept, substantially non-vegetated, ground surface: the preferred substance from which these fabrics are made is an ultra violet (UV) stabilized, high density polyethylene (HDPE) material, the porosity of these fabrics are in the range of 20% to 80%, their thicknesses are in the range of 0.5 to 2 millimeters, and their weights per unit surface area are in the range of 100 to 250 g/m$^2$. Various manufacturing methods are available from which to construct such fabrics, these include knitting or weaving techniques that utilizes the ultra violet UV stabilized, HDPE material in the form of an effective yarn that has an average diameter in the range of 0.10 to 0.40 millimeters. FIGS. 2A and 2B show examples of some of the fabrics that are suitable for use in the process of the present invention.

Various possible suppliers for such fabrics include Royal Ten Cate Inc., Pendergrass, Ga. and Maccaferri Inc., Williamsport, Md.; plus a significant number of suppliers and manufacturers in China, India, and South Korea.

There are currently many uses typical uses for such fabrics. These include: (a) shading purposes when they are appropriately hung above a space that is to be shaded (wherein, depending on the fabric's porosity, etc., they can block in the range 20% to 80% of the light from being transmitted through the fabric), (b) privacy screening or visibility blocking purposes when they are hung vertically, (c) for use as large surface area materials or vertically-mounted signs on which various advertisements, etc. can be printed, (d) as wind and dust fencing or screens when they are hung vertically, (e) as a bottom liner surface that is buried under a landfill or other dumping ground, and (f) as a protective ballast system that is installed over the top of exposed geo-membrane lining or tarp systems to protect them from UV degradation and wind damage.

Figure 3A:
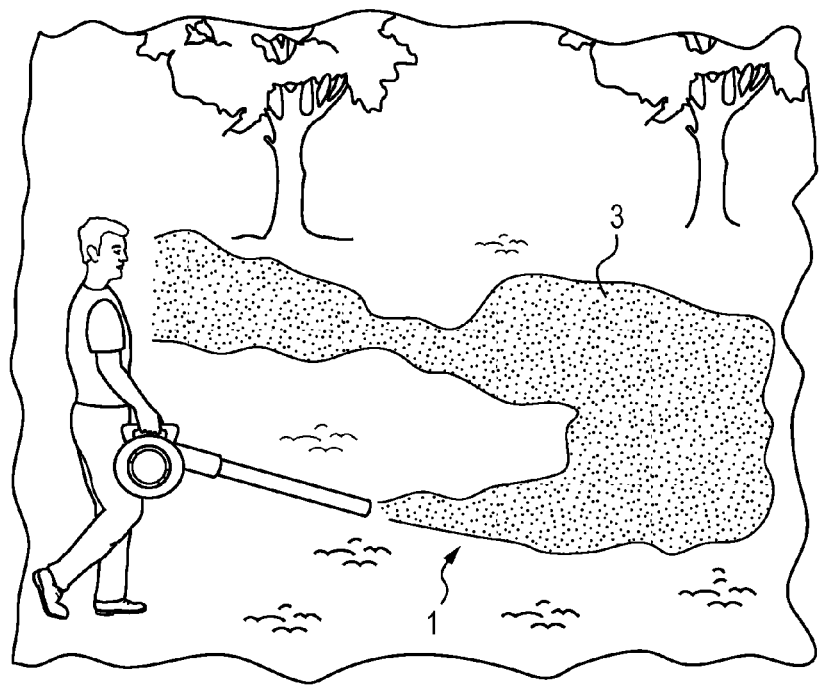
FIG. 3A is an illustration of the amount of airborne dust that rises from a GSTBT as a result of the nozzle of a hand blower being directed onto the GSTBT from a distance of approximately two feet and an impact angle of approximately 60 degrees to the surface.
Figure 3B:
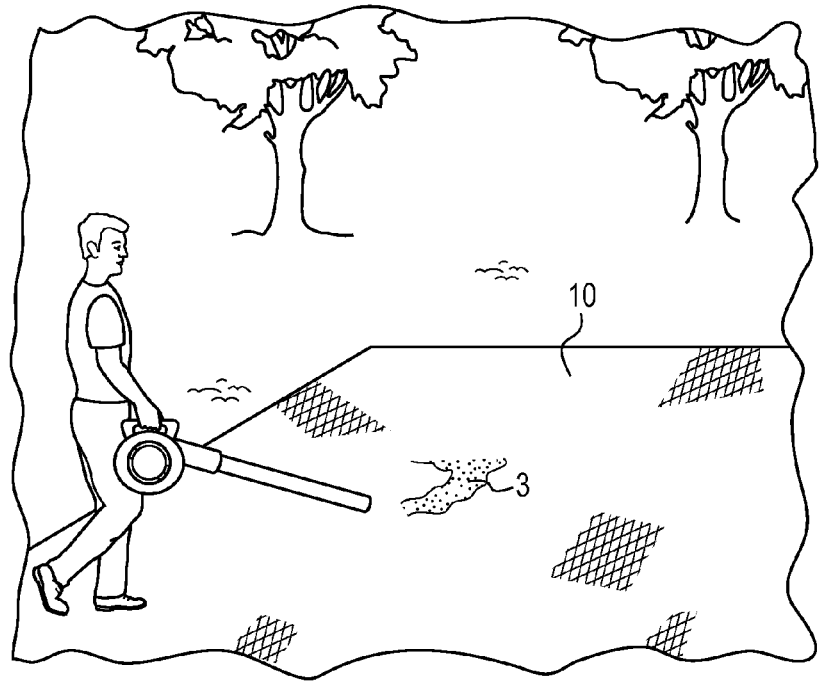
FIG. 3B is an illustration of the amount of airborne dust that rises from this same GSTBT, under the impact of the same hand blower, after the process of the present invention has been applied to the GSTBT so as to cover it with a thin, porous, polymeric, geotextile fabric.

FIGS. 3A and 3B illustrate the effectiveness of the present invention in minimizing the rising of airborne dust 3 from a wind-swept, ground surface 1. In these illustrations, the wind force applied to the surface is generated by a hand blower or leaf sweeper that creates at the exit of its approximately 3 inch diameter nozzle, which is held approximately 2 feet from the ground surface, an air jet whose average flow rate is in the range of 250-2,500 cfm. FIG. 3A illustrates the amount of airborne dust 3 that rises from a GSTBT as a result of the nozzle of this hand blower operating at 500 cfm being directed onto the GSTBT from a distance of approximately two feet and an impact angle of approximately 45 degrees to the surface. Meanwhile, FIG. 3B illustrates the amount of airborne dust that rises from this same site, under the impact of the same hand blower, after the process of the present invention has been applied to the site so as to cover it with a thin, porous, polymeric, geotextile fabric 10. It is seen that the dust levels above the covered site have been reduced to less than 5% of what they were before the site was treated by the present invention.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereafter set forth in the claims to the invention.

We claim:

1. A process for suppressing airborne dust temporarily rising from and then resettling onto a substantially non-vegetated, ground surface as a result of the winds present above said surface (i.e., a ground surface to-be-treated, GSTBT) so as to minimize the dust hazards to people and machinery working on said GSTBT, and wherein said GSTBT has a perimeter edge and a surface area that is characterized in terms of a representative width, W, times a representative length, L, said process comprising the steps of:

spreading directly on the entirety of said GSTBT a continuous layer of a thin, porous, polymeric fabric having a configuration adapted to minimize the dust hazards to people and machinery working on said GSTBT from airborne dust temporarily rising from and then resettling onto said GSTBT, wherein said fabric having a boundary edge, utilizing a means for adhering chosen from the group including using a material to bury or a keep-fabric-from-moving stake to adhere portions of the entirety of said boundary edge of said fabric to said GSTBT at a plurality of locations that are only proximate said perimeter edge of said GSTBT, and wherein said keep-fabric-from-moving stake having a length that is only appropriate for just adhering portions of said boundary edge of said fabric to said GSTBT so as to keep said fabric from moving because of said winds, wherein said thin, porous, polymeric fabric is made from an ultra violet (UV) stabilized, high density polyethylene (HDPE) material, wherein said porosity of said fabric is in the range of 20% to 80%, and wherein said thickness of said fabric is in the range of 0.5 to 2 millimeters.

2. The process as recited in claim 1, wherein:
said spreading step entails utilizing said thin, porous, polymeric fabric in the form of a roll of said fabric which has a uniform roll width, $w_r$, and a specified roll length $l_r$, and when $W > w_r$, said spreading step further includes unrolling said roll of said fabric so as to lay down and cover said GSTBT with parallel and adjoining strips of said fabric that cover the entire length of said GSTBT and wherein said boundary edges of each of said strips are over-lapped a prescribed amount.

3. The process as recited in claim 2, further comprising the step of:
adhering together said over-lapped, boundary edges of said parallel and adjoining strips so as to create a continuous fabric which has enough combined width in order to cover the entire width, W, of said GSTBT.

4. The process as recited in claim 3, wherein:
said fabric having a weight per unit surface area that is in the range of 100 to 250 $g/m^2$.

5. The process as recited in claim 3, wherein:
said fabric having a method of construction that is chosen from the group including knitting or weaving techniques that utilizes said material in the form of an effective yarn that has an average, effective diameter in the range of 0.1 to 0.4 millimeters.

6. The process as recited in claim 4, wherein:
said fabric having a method of construction that is chosen from the group including knitting or weaving techniques that utilizes said material in the form of an effective yarn that has an average, effective diameter in the range of 0.1 to 0.4 millimeters.

7. The process as recited in claim 2, wherein:
said fabric having a weight per unit surface area that is in the range of 100 to 250 $g/m^2$.

8. The process as recited in claim 7, wherein:
said fabric having a method of construction that is chosen from the group including knitting or weaving techniques that utilizes said material in the form of an effective yarn that has an average, effective diameter in the range of 0.1 to 0.4 millimeters.

9. The process as recited in claim 2, wherein:
said fabric having a method of construction that is chosen from the group including knitting or weaving techniques that utilizes said material in the form of an effective yarn that has an average, effective diameter in the range of 0.1 to 0.4 millimeters.

10. The process as recited in claim 1, wherein:
said fabric having a weight per unit surface area that is in the range of 100 to 250 $g/m^2$.

11. The process as recited in claim 10, wherein:
said fabric having a method of construction that is chosen from the group including knitting or weaving techniques that utilizes said material in the form of an effective yarn that has an average, effective diameter in the range of 0.1 to 0.4 millimeters.

12. The process as recited in claim 1, wherein:
said fabric having a method of construction that is chosen from the group including knitting or weaving techniques that utilizes said material in the form of an effective yarn that has an average, effective diameter in the range of 0.1 to 0.4 millimeters.

* * * * *